US007637992B2

(12) United States Patent
Mistry

(10) Patent No.: US 7,637,992 B2
(45) Date of Patent: Dec. 29, 2009

(54) TRISAZO DYES, COMPOSITIONS AND INK JET PRINTING PROCESSES

(75) Inventor: Prahalad Manibhai Mistry, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 12/224,616

(22) PCT Filed: Apr. 27, 2007

(86) PCT No.: PCT/GB2007/001562

§ 371 (c)(1), (2), (4) Date: Sep. 2, 2008

(87) PCT Pub. No.: WO2007/132151

PCT Pub. Date: Nov. 22, 2007

(65) Prior Publication Data

US 2009/0041939 A1 Feb. 12, 2009

Related U.S. Application Data

(60) Provisional application No. 60/802,765, filed on May 24, 2006.

(30) Foreign Application Priority Data

May 9, 2006 (GB) ................................ 0609086.4

(51) Int. Cl.

*C09D 11/02* (2006.01)
*C09B 31/16* (2006.01)
*B41J 2/01* (2006.01)

(52) U.S. Cl. ....................... 106/31.5; 534/754; 347/100

(58) Field of Classification Search ................ 106/31.5, 106/31.52; 534/754, 815; 347/100

See application file for complete search history.

(56) References Cited

U.S. PATENT DOCUMENTS

| | | | | |
|---|---|---|---|---|
| 6,749,674 | B2 * | 6/2004 | Geisenberger et al. | 106/31.5 |
| 7,041,161 | B2 * | 5/2006 | Mistry et al. | 106/31.5 |
| 7,052,538 | B2 * | 5/2006 | Mistry et al. | 106/31.5 |
| 7,056,376 | B2 * | 6/2006 | Popat et al. | 106/31.5 |
| 2001/0027734 | A1 * | 10/2001 | Geisenberger et al. | 106/31.5 |
| 2004/0020404 | A1 * | 2/2004 | Popat et al. | 106/31.5 |
| 2005/0200671 | A1 * | 9/2005 | Mistry et al. | 347/100 |
| 2005/0217535 | A1 * | 10/2005 | Mistry et al. | 106/31.5 |
| 2007/0062409 | A1 * | 3/2007 | Mistry et al. | 106/31.5 |
| 2008/0257206 | A1 * | 10/2008 | Rengaswamy et al. | 106/31.43 |
| 2008/0257207 | A1 * | 10/2008 | Rengaswamy et al. | 106/31.43 |
| 2009/0208713 | A1 * | 8/2009 | Mistry et al. | 106/31.52 |

FOREIGN PATENT DOCUMENTS

| | | |
|---|---|---|
| JP | 05 148438 | 6/1993 |
| JP | 06 192604 | 7/1994 |
| WO | WO 01/72906 A2 | 10/2001 |
| WO | WO 03/095563 A1 | 11/2003 |
| WO | WO 03/106572 A1 | 12/2003 |
| WO | WO 2004/046252 A1 | 6/2004 |
| WO | WO 2005/052065 A1 | 6/2005 |

* cited by examiner

*Primary Examiner*—Helene Klemanski
(74) *Attorney, Agent, or Firm*—Morgan Lewis & Bockius LLP

(57) ABSTRACT

A compound of Formula (1) and compounds of Formula (2) or a salt thereof:

Formula (1)

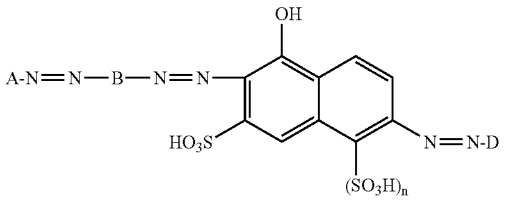

wherein:

A is a beta naphthyl group of formula X,

Formula X

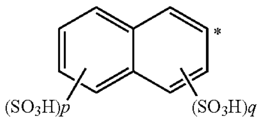

wherein * is the point of attachment to the azo group in Formula (1) or (2); p and q are each independently 0, 1 or 2 and the sum of p+q is not zero; B is optionally substituted phenylene or naphthylene; n is 0 or 1; and D is an optionally substituted pyrazolyl group. The compound or salt is useful in an ink for ink jet printing.

16 Claims, No Drawings

TRISAZO DYES, COMPOSITIONS AND INK JET PRINTING PROCESSES

This is a Section 371 national phase filing based on PCT/GB07/001562, filed Apr. 27, 2007 which claims priority from UK Application No. 0609086.4, filed May 9, 2006 and U.S. Provisional Application No. 60/802,765, filed May 24, 2006.

This invention relates to compounds, to compositions and to their use in printing, particularly but not exclusively, ink jet printing ("IJP"). IJP is a non-impact printing technique in which droplets of ink are ejected through a fine nozzle onto a substrate without bringing the nozzle into contact with the substrate.

There are many demanding performance requirements for dyes and inks used in IJP. For example, it is desirable that they provide sharp, non-feathered images having good optical density, water-fastness, light-fastness and resistance to fading in the presence of oxidising air pollutants (e.g. ozone). The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

JP10195320 describes dyes including tris-azo dyes carrying a pyrazolyl azo group and their use in the coloration of paper and pulp.

U.S. Pat. No. 6,749,674 describes metal complexes of tris-azo dyes derived from tris-azo molecules optionally containing a (substituted) pyrazolylazo moiety. The copper complexes are said to be particularly preferred.

WO2005/052065 describes non-metallised tris-azo dyes containing a (substituted) pyrazolylazo moiety.

We have now surprisingly found that certain non-metallised compounds having both a (substituted) pyrazolylazo moiety and a sulpho-substituted beta-naphthyl group provide valuable dyes for ink jet printing inks.

According to the first aspect of the present invention there is provided a compound selected from the group consisting of compounds of Formula (1) and compounds of Formula (2) or a salt thereof:

Formula (1)

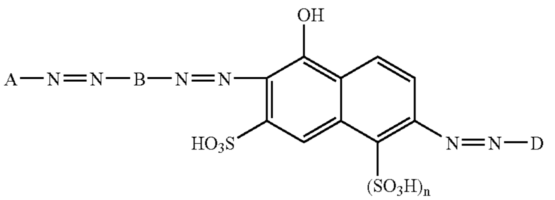

Formula (2)

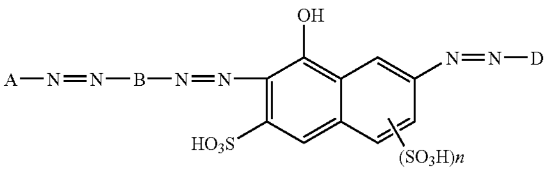

wherein:

A is a beta naphthyl group of formula X,

Formula X

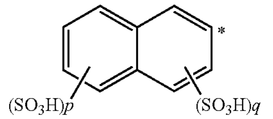

wherein * is the point of attachment to the azo group in Formula (1) or (2), p and q are each independently 0, 1 or 2 and the sum of p+q is not zero;

B is optionally substituted phenylene or naphthylene;

n is 0 or 1; and

D is an optionally substituted pyrazolyl group.

A is a beta naphthyl group, i.e. it is attached to the azo group at the beta position on the naphthyl ring. The beta position is also referred to in the art as the 2-position.

Preferably, A is not substituted by groups other than sulpho (i.e. —$SO_3H$).

Preferably, in formula X, p and q are each independently 0, 1 or 2, provided (p+q)<4 (i.e. the total of p+q is 1, 2 or 3). More preferably, the sum of p+q is 2. Most preferably, p=1 and q=1.

The optional substituents which may be present on B are each independently preferably selected from hydroxy, halo, nitro, cyano, carboxy (i.e. —COOH), sulpho (i.e. —$SO_3H$), phosphato (i.e. —$PO_3H_2$), optionally substituted amino (especially amino carrying one or more $C_{1-4}$-alkyl groups), optionally substituted acylamino (especially $C_{1-4}$acylamino or phenylacylamino, each of which optionally carries a sulpho or a carboxy group), optionally substituted ureido (especially ureido carrying one or two $C_{1-4}$-alkyl groups), carboxyester, optionally substituted alkyl (especially $C_{1-6}$-alkyl), optionally substituted cycloalkyl (especially $C_{1-6}$-cycloalkyl), optionally substituted alkoxy (especially $C_{1-6}$-alkoxy), optionally substituted aryl or heteroaryl (especially phenyl and naphthyl), optionally substituted aryloxy, azo (especially arylazo, particularly phenylazo or naphthylazo), $OCOOR^8$, $OCOR^8$, $COR^8$, $CONR^8R^9$, $OCONR^8R^9$, $SR^8$, $SO_2NR^8R^9$, or $SO_2R^8$, wherein $R^8$ and $R^9$ each independently represent H, optionally substituted alkyl (especially $C_{1-6}$-alkyl), optionally substituted cycloalkyl, or optionally substituted aryl. Without limitation, groups such as sulpho, phosphato and carboxy for example may be present in a salt form.

Preferably, the optional substituents on B are selected from carboxy, sulpho, phosphato, optionally substituted amino, optionally substituted acylamino, optionally substituted ureido, optionally substituted alkyl (especially $C_{1-6}$-alkyl), optionally substituted alkoxy (especially $C_{1-6}$-alkoxy) and optionally substituted aryl.

When B is substituted phenylene the phenylene ring preferably carries one or more groups selected from optionally substituted $C_{1-6}$-alkyl, optionally substituted $C_{1-6}$-alkylthio, optionally substituted $C_{1-6}$-alkoxy, optionally substituted amino, optionally substituted ureido, carboxy and sulpho. When B is substituted phenylene, the phenylene ring more preferably carries at least one, more preferably one or two, most preferably two, substituents selected from optionally substituted $C_{1-6}$-alkyl (especially optionally substituted methyl and ethyl) and optionally substituted $C_{1-6}$-alkoxy (especially optionally substituted methoxy and ethoxy). The preferred substituent for the optionally substituted $C_{1-6}$-alkyl and optionally substituted $C_{1-6}$-alkoxy groups is —OH.

When B is substituted naphthylene, the naphthylene ring preferably carries one or more water solubilising groups, more preferably one or more, especially one or two, groups selected from carboxy, sulpho and phosphato groups.

As examples of optionally substituted phenylene and naphthylene groups represented by B there may be mentioned 2,5-di(2-hydroxyethoxy)phen-1,4-ylene, 2,5-dimethoxyphen-1,4-ylene, 2,5-diethoxyphen-1,4-ylene, 2-methoxy-5-aminophen-1,4-ylene, 2-methoxy-5-acetylaminophen-1,4-ylene, 2-methyl-5-methoxy-phen-1,4-ylene, 2,5-dimethylphen-1,4-ylene, 7-sulphonaphth-1,4-ylene, 6-sulphonaphth-1,4-ylene and 2-ethoxy-6-sulphonaphth-1,4-ylene.

It is preferred that B is an optionally substituted phenylene group. It is most preferred that B is a substituted phenylene group, which is preferably substituted as described above.

Preferably D is a pyrazolyl group carrying at least one carboxy, sulpho or phosphato group. More preferably D is a group of Formula (3a), (3b) or (3c), even more preferably D is of Formula (3a) or (3b) and most preferably D is of Formula (3a):

Formula (3a)

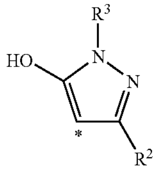

Formula (3b)

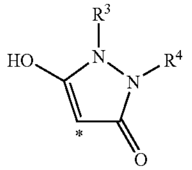

Formula (3c)

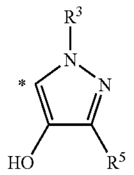

wherein $R^2$ and $R^5$ are each independently H, carboxy, cyano or optionally substituted $C_{1-6}$-alkyl, optionally substituted $C_{1-6}$alkoxy, optionally substituted acyl, optionally substituted aryl, optionally substituted amino, optionally substituted amido, optionally substituted carbonamido ($CONR^6R^7$), optionally substituted carboxyester, optionally substituted sulphonamido ($SO_2NR^6R^7$) or optionally substituted alkylsulphonyl group; (wherein $R^6$ and $R^7$ are each independently H or optionally substituted $C_{1-6}$ alkyl);

$R^3$ and $R^4$ are each independently H, hydroxy, halo, nitro, cyano, carboxy, sulpho, phosphato, optionally substituted amino (especially amino carrying one or more $C_{1-4}$-alkyl groups), optionally substituted acylamino (especially $C_{1-4}$acylamino or phenylacylamino, each of which optionally carries a sulpho or a carboxy group), optionally substituted ureido (especially ureido carrying one or two $C_{1-4}$-alkyl groups), optionally substituted $C_{1-6}$-alkyl, optionally substituted $C_{1-6}$-cycloalkyl, optionally substituted $C_{1-6}$-alkoxy, optionally substituted $C_{1-6}$-alkylthio, optionally substituted aryl (especially phenyl), optionally substituted $C_{1-6}$-alkyl sulphonyl and optionally substituted sulphonamido (especially sulphonamido carrying one or two $C_{1-4}$-alkyl groups); and

* shows the point of attachment to the azo linkage in Formula (1) or (2).

$R^2$ is preferably H, an optionally substituted $C_{1-6}$-alkyl (especially methyl), $C_{1-6}$-alkoxy, $C_{1-6}$-acyl or amino group or a group capable of hydrogen bonding in the free acid form with the adjacent azo group such as carboxy or carbonamide (i.e. $CONR^6R^7$, wherein $R^6$ and $R^7$ are each independently H or optionally substituted $C_{1-6}$ alkyl.

As examples of the most preferred groups represented by $R^2$ there may be mentioned methyl, carboxy, $CONR^6R^7$ and H. However, most preferably $R^2$ is carboxy or $CONR^6R^7$ (especially carboxy).

$R^3$ and $R^4$ are most preferably each independently an optionally substituted aryl group. More preferably, $R^3$ and $R^4$ are each independently a phenyl or naphthyl group (especially a phenyl group) carrying one or more substituents selected from carboxy, sulpho, nitro, phosphato, optionally substituted $C_{1-4}$-alkyl, optionally substituted $C_{1-4}$-alkoxy, optionally substituted amino or optionally substituted $C_{1-4}$-acylamino. Most preferably, $R^3$ and $R^4$ are each independently a phenyl or naphthyl group (especially a phenyl group) carrying one or more sulpho groups.

As examples of groups represented by $R^3$ and $R^4$ but not limited thereto there may be mentioned 4-sulphophenyl and 2-sulphonaphthyl.

$R^5$ is most preferably a carboxy or a $C_{1-4}$alkylcarboxyester group.

Preferred optionally substituted $C_{1-6}$-alkyl groups and $C_{1-6}$-alkoxy groups mentioned herein respectively include optionally substituted $C_{1-4}$-alkyl groups or optionally substituted $C_{1-4}$-alkoxy groups, more preferably $C_{1-4}$-alkyl groups or $C_{1-4}$-alkoxy groups which are unsubstituted or carry a halo atom, or a hydroxy, carboxy, sulpho or phosphato group.

Where $R^2$, $R^3$, $R^4$ and/or $R^5$ are an optionally substituted aryl group, they are preferably optionally substituted phenyl groups optionally substituted by nitro, carboxy, sulpho, phosphato, optionally substituted amino (especially amino carrying one or more $C_{1-4}$-alkyl groups), optionally substituted acylamino (especially $C_{1-4}$acylamino or phenylacylamino, each of which optionally carries a sulpho or a carboxy group), optionally substituted $C_{1-6}$-alkyl, optionally substituted $C_{1-6}$-cycloalkyl, and optionally substituted $C_{1-6}$-alkoxy. In addition, the optionally substituted phenyl group preferably also carries at least one water-solubilising group selected from carboxy, sulpho and phosphato.

Preferred optionally substituted carbonamido or sulphonamido groups which may be present on B, $R^2$, $R^3$, $R^4$ and $R^5$ are of the formula $CONR^6R^7$ or $SO_2NR^6R^7$ respectively wherein $R^6$ and $R^7$ are each independently H or optionally substituted $C_{1-6}$ alkyl.

Preferred optionally substituted amino groups which may be present on B, $R^2$, $R^3$, $R^4$ and $R^5$ respectively are optionally substituted acylamino, especially $C_{1-4}$-acylamino, more preferably optionally substituted ureido which is unsubstituted or carries a carboxy, sulpho or phosphato group.

Preferred acyl groups which may be present on B, $R^2$, $R^3$, $R^4$ and $R^5$ respectively are optionally substituted $C_{1-4}$alkylacyl, optionally substituted phenylacyl, preferably acetyl or benzoyl.

Preferred substituents which may be present on the optionally substituted $C_{1-6}$-alkyl, $C_{1-6}$-alkoxy, $C_{1-6}$-alkylthio, aryl and $C_{1-6}$-alkylsulphonyl substituents on any of B, $R^2$, $R^3$, $R^4$, $R^5$, $R^6$ and $R^7$ are independently selected from hydroxy, halo, nitro, cyano, carboxy, sulpho, phosphato, acylamino, ureido, $C_{1-6}$-alkyl, preferably $C_{1-6}$-alkyl, more preferably methyl or ethyl, $C_{1-6}$-alkoxy, preferably $C_{1-4}$-alkoxy, more preferably methoxy or ethoxy, $C_{1-10}$-alkylthio, aryl, preferably phenyl or naphthyl, $C_{1-6}$-alkyl sulphonyl and sulphonamido.

In a preferred embodiment of the compound or salt according to the first aspect of the present invention:

A is not substituted by any group other than sulpho;

B is phenylene or naphthylene carrying one or two substituents (especially two) selected from sulpho, optionally substituted $C_{1-6}$ alkyl (especially methyl), optionally substituted $C_{1-6}$ alkoxy (especially methoxy, ethoxy and 2-hydroxyethoxy) and optionally substituted amino (e.g. optionally substituted acylamino);

n is 0 or 1;

D is of Formula (3a),(3b) or (3c), especially (3a); wherein:

Formula (3a)

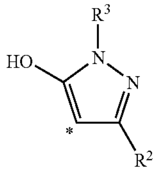

Formula (3b)

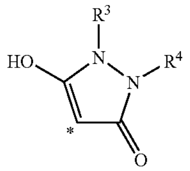

Formula (3c)

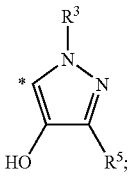

$R^2$ is H, methyl, carboxy or carbonamide (especially carboxy);

$R^3$ and $R^4$ are each independently phenyl or naphthyl (especially phenyl) carrying one or two substituents selected from sulpho and carboxy (especially sulpho); and $R^5$ is a $C_{1-4}$alkylcarboxyester.

In a further preferred embodiment of the compound or salt according to the first aspect of the present invention:

A is of formula X',

Formula X'

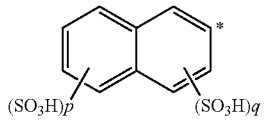

wherein * is the point of attachment to the azo group in Formula (1) or (2), p and q are each independently 0, 1 or 2 and the sum of p+q is 1, 2 or 3;

B is phenylene or naphthylene carrying one or two substituents selected from sulpho, methyl, methoxy, ethoxy and 2-hydroxyethoxy;

n is 0 or 1; and

D is of Formula (3a), (3b) or (3c), especially (3a):

Formula (3a)

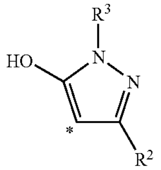

Formula (3b)

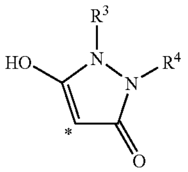

Formula (3c)

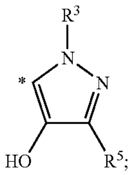

wherein:

$R^2$ is H, methyl, carbonamide or carboxy (especially carboxy);

$R^3$ and $R^4$ are each independently phenyl or naphthyl (especially phenyl) carrying one or two substituents selected from sulpho and carboxy (especially sulpho); and $R^5$ is a $C_{1-4}$alkylcarboxyester.

Preferred compounds according to the first aspect of the present invention are of formulae (1A-1H) and salts thereof:

Formula 1A

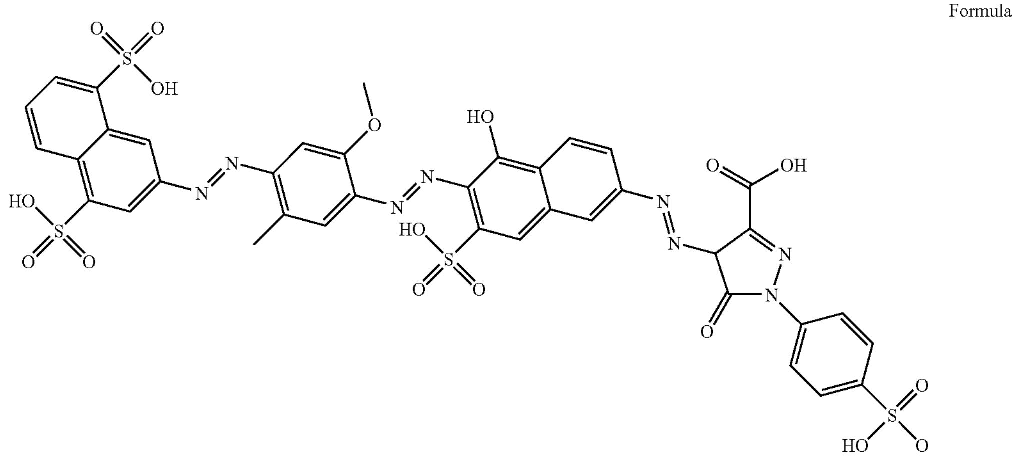

-continued
Formula 1B
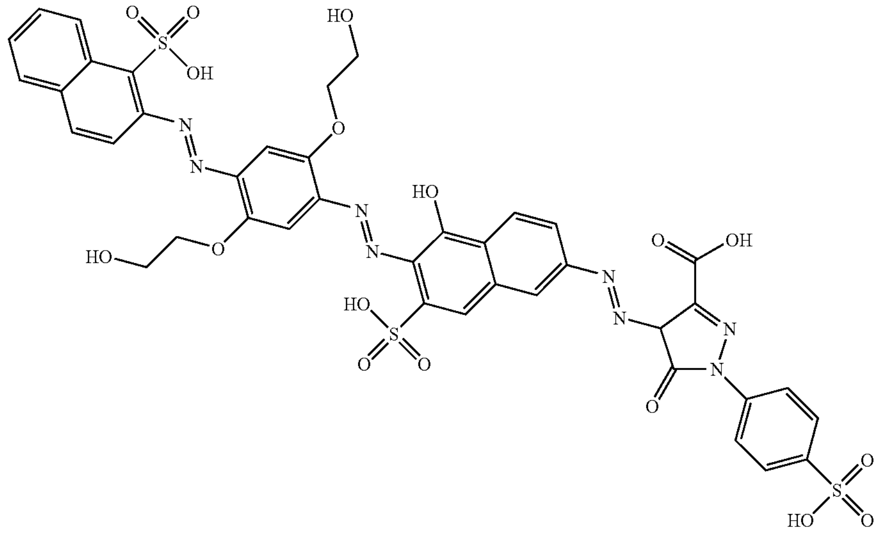
Formula 1C
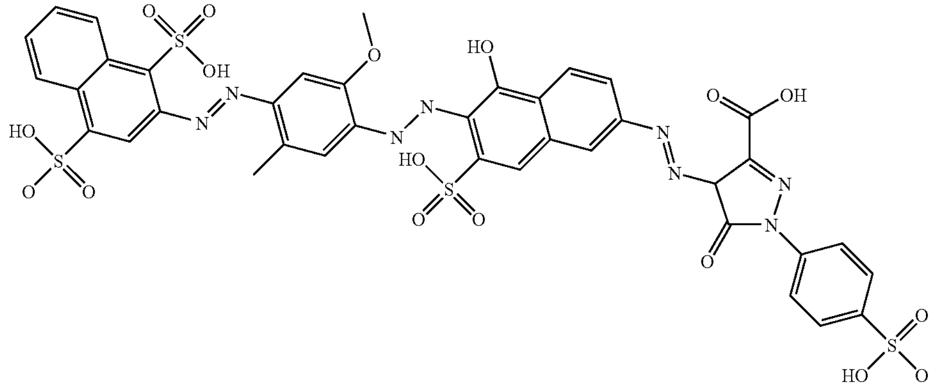
Formula 1D
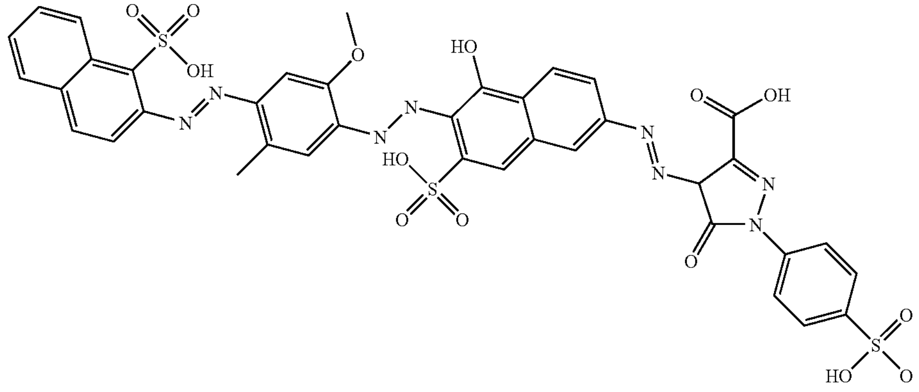

-continued
Formula 1E
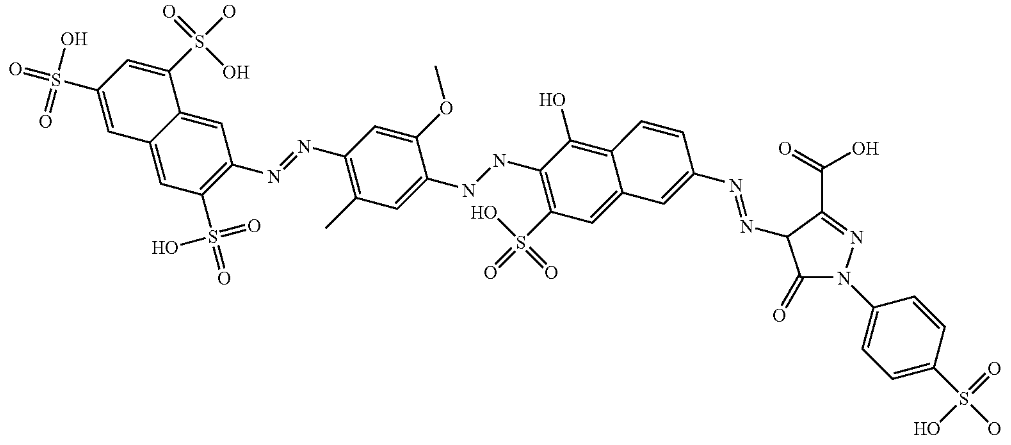
Formula 1F
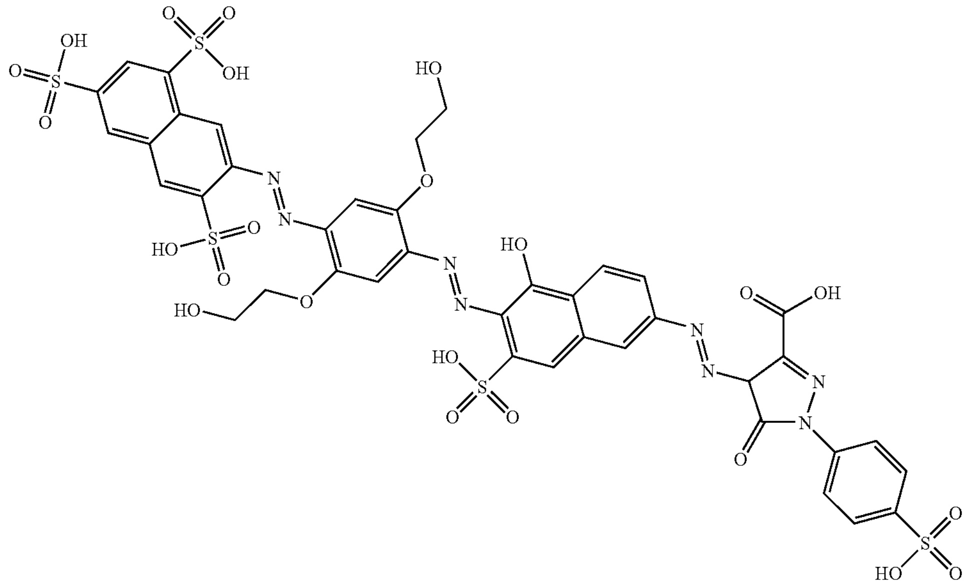
Formula 1G
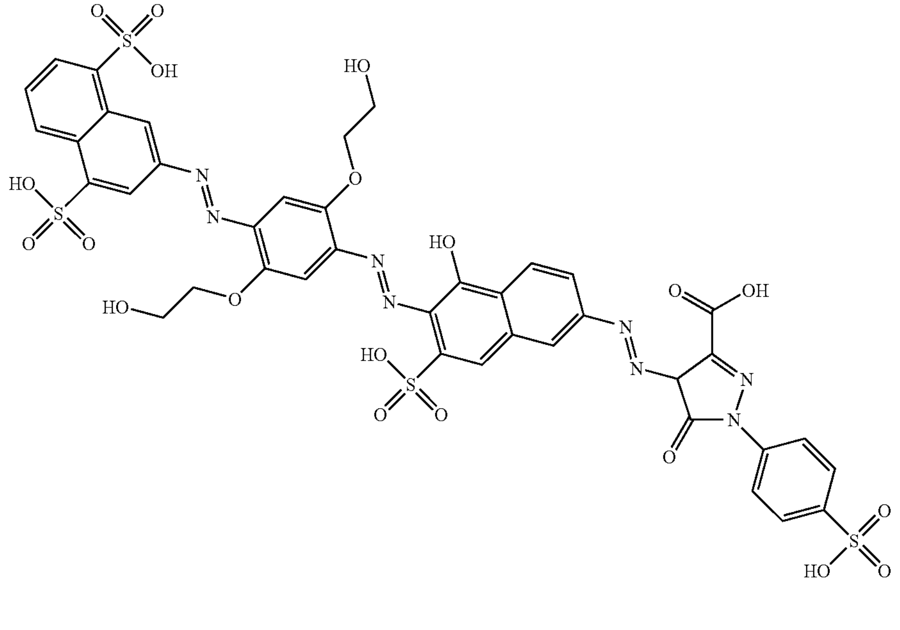

-continued

Formula 1H

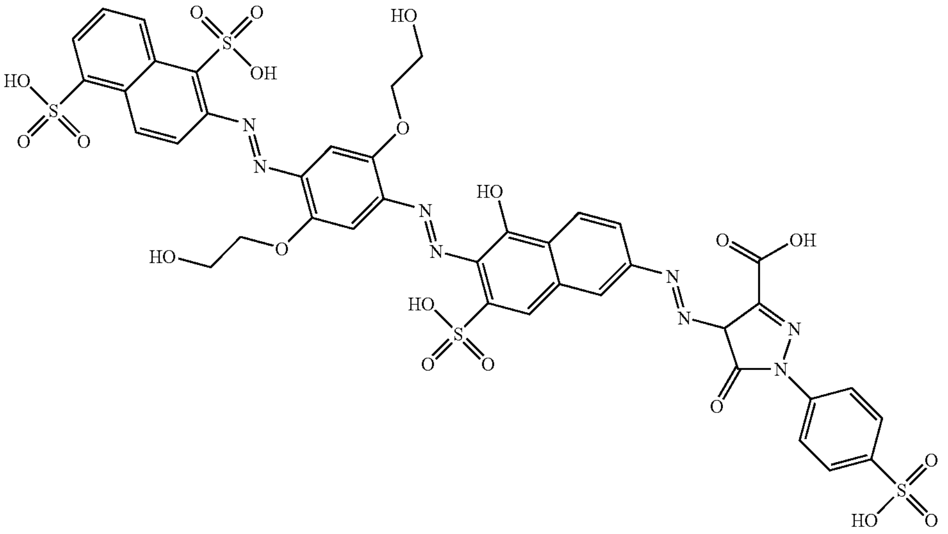

An especially preferred compound is of Formula 1C and also especially preferred are salts thereof.

It will be appreciated that the compounds of Formula (1) or Formula (2) may be prepared by methods known in the art. It will be evident that salts of the compounds may be prepared analogously. For example, the salts of the compounds of Formula (1) may be prepared by diazotising a compound of the Formula (4) wherein n, A and B are as hereinbefore defined to give a diazonium salt and coupling the resultant diazonium salt with a compound of Formula H-D wherein D is as hereinbefore defined:

Formula (4)

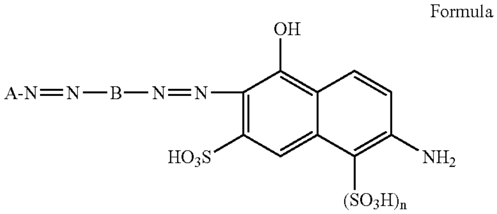

The diazotisation is preferably performed at a temperature of 0° C. to 10° C. Preferably the diazotisation is performed in water, preferably at a pH below 7. Dilute mineral acid, for example HCl or $H_2SO_4$, may be used to achieve the desired pH conditions.

The salt of the compound of Formula (4) may be prepared by first diazotising a compound of Formula A-$NH_2$ (where the NH2 is attached at the position marked with * in Formula X) and coupling this onto a compound of Formula B—$NH_2$ by methods known in the art to yield a compound of Formula A-N═N—B—$NH_2$. The method then continues by diazotising the compound of Formula A-N═N—B—$NH_2$ to give a diazonium salt and coupling the resultant diazonium salt with 1-hydroxy-3-sulpho-6-aminonaphthylene optionally carrying a sulpho group at the 5-position, wherein A and B are as hereinbefore defined.

For the salts of the compounds of Formula (2), the same method may be applied as for compounds of Formula (1) above except that the compound of Formula (4) may be prepared by diazotising the compound of Formula A-N═N—B—$NH_2$ to give a diazonium salt and coupling the resultant diazonium salt with 1-hydroxy-3-sulpho-7-aminonaphthylene optionally carrying a sulpho group at the 5- or 6-position.

In an alternative method of preparing the salts of the compounds of Formula (1) or (2), a compound of Formula A-$NH_2$ (where the NH2 is attached at the position marked with * in Formula X) is diazotised and coupled onto a compound of Formula B—$NH_2$ by methods known in the art to yield a compound of Formula A-N═N—B—$NH_2$. Separately, 1-hydroxy-3-sulpho-6-aminonaphthylene optionally carrying a sulpho group at the 5-position is then diazotised and coupled on a formula of Formula H-D wherein D is as hereinbefore defined to give a compound of Formula (5):

Formula (5)

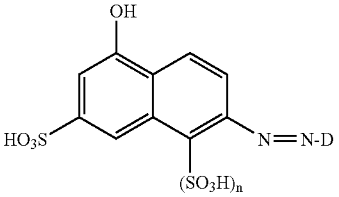

The compound of Formula A-N═N—B—$NH_2$ is then diazotised and then coupled onto the compound of Formula (5).

Reaction conditions for all of the above processes are those generally used in the dyestuff art, for example as described in EP 0356080.

The compounds of the present invention may be provided in the form of a salt. Accordingly, references herein to the compounds include references to salts thereof. In particular, without limitation, any sulpho, carboxy or phosphato group may be present in the form of a salt. Preferred salts are alkali metal salts (especially lithium, sodium and potassium salts), ammonium and substituted ammonium salts and mixtures thereof. Especially preferred salts are sodium, potassium and lithium salts, salts with ammonia and volatile amines and mixtures thereof. The lithium salts have good solubility, forming inks which are particularly storage stable with low toxicity and no tendency to block ink jet nozzles.

The compounds of the present invention may be converted into a desired salt using known techniques. For example, an alkali metal salt of a compound of the present invention may be converted into the ammonium or substituted ammonia salt by dissolving an alkali metal salt of the compound in water, acidifying with a mineral acid and adjusting the pH of the solution to pH 9 to 9.5 with ammonia or the amine and removing the alkali metal cations by dialysis or by use of an ion exchange resin.

Examples of amines which may be used to form such salts but not limited thereto include: methylamine, dimethylamine, trimethylamine, ethylamine, n-propylamine, iso-propylamine, n-butylamine, iso-butylamine, sec-butylamine, tert-butylamine, piperidine, pyridine, morpholine, allylamine, diethylamine, triethylamine, tetramethyl amine and mixtures thereof. It is not essential that the dyes of the present invention are completely in the form of the ammonium salt or substituted ammonium salt. Dyes which include both mixed alkali metal salts and either ammonium salts or substituted ammonium salts are effective, especially those in which at least 50% of the cations are ammonium or substituted ammonium ions Still further salts are those with the counter ions described in U.S. Pat. No. 5,830,265, claim 1, integer (b), which are included herein by reference thereto.

The compounds or salts of the present invention may exist in tautomeric forms other than those shown in this specification. These tautomers are included within the scope of the present claims.

In a second aspect of the present invention there is provided an ink composition which comprises a compound or salt thereof according to the first aspect of the present invention and a liquid medium.

Preferred liquid media include water, a mixture of water and an organic solvent and an organic solvent free from water. Preferably, the liquid medium comprises a mixture of water and an organic solvent.

A preferred composition according to the second aspect of the present invention comprises:

(a) from 0.01 to 30 parts of a compound or salt thereof according to the first aspect of the present invention as hereinbefore described; and (b) from 70 to 99.99 parts of a liquid medium;

wherein the liquid medium comprises an organic solvent and all parts are by weight and the number of parts of (a)+(b)=100.

The number of parts of component (a) is preferably from 0.1 to 20, more preferably from 0.5 to 15, and especially from 1 to 6 parts. The number of parts of component (b) is preferably from 99.9 to 80, more preferably from 99.5 to 85, especially from 99 to 94 parts. Preferably component (a) is completely dissolved in component (b). Preferably component (a) has a solubility in component (b) at 20° C. of at least 10%. This allows the preparation of liquid dye concentrates which may be used to prepare inks and reduces the chance of the dye precipitating if evaporation of the liquid medium occurs during storage.

Preferred liquid media comprise water and an organic solvent, preferably in a weight ratio of water to organic solvent of 99:1 to 1:99, more preferably 99:1 to 50:50 and especially 95:5 to 80:20.

It is preferred that the organic solvent is a water-miscible organic solvent or a mixture of such solvents. Preferred water-miscible organic solvents include: $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially ((2-methoxy-2)-ethoxy)-2-ethoxyethanol.

A preferred liquid medium comprises:

(a) from 75 to 95 parts water; and (b) from 25 to 5 parts in total of one or more solvents selected from diethylene glycol, 2-pyrrolidone, thiodiglycol, N-methylpyrrolidone, cyclohexanol, caprolactone, caprolactam and pentane-1,5-diol;

wherein the parts are by weight and the sum of the parts (a) and (b)=100.

Another preferred liquid medium comprises:

(a) from 60 to 80 parts water;

(b) from 2 to 20 parts diethylene glycol; and (c) from 0.5 to 20 parts in total of one or more solvents selected from 2-pyrrolidone, N-methylpyrrolidone, cyclohexanol, caprolactone, caprolactam, pentane-1,5-diol and thiodiglycol;

wherein the parts are by weight and the sum of the parts (a), (b) and (c)=100.

Examples of further suitable liquid media comprising a mixture of water and one or more organic solvents are described in U.S. Pat. Nos. 4,963,189, 4,703,113, 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the compound in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink composition.

Liquid media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$ chains, and sulphonamides. The compound of Formula (1) or (2) may be dissolved in the low melting point solid or may be finely dispersed in it.

The compound of Formula (1) or (2) or salt thereof may be used as the sole colorant in the ink composition because of its attractive black shade. However, if desired, one may combine the compound of Formula (1) or (2) or salt thereof together with one or more further colorants to reduce nozzle blockage (by improving their solubility) or if a slightly different shade is required for a particular end use. Thus, inks according to the present invention may be obtained which comprise at least one further colorant. The further colorants are preferably dyes. When further colorants are included in the composition these are preferably selected from black, magenta, cyan, yellow, violet, orange, blue and green colorants and combinations thereof.

Suitable further black colorants include C.I. Food Black 2, C.I. Direct Black 19, C.I. Reactive Black 31, PRO-JET™ Fast Black 2, C.I. Direct Black 195; C.I. Direct Black 168; other black colorants made or sold by original equipment manufacturers (OEMs) including Lexmark, Seiko Epson, Canon and Hewlett-Packard or by colorant manufacturers including Fuji Photo Film Co., Nippon Kayaku and Mitsubishi and other black colorants described in patents and patent applications by OEMs including the aforesaid Lexmark (e.g. EP 0 539,178 A2, Example 1, 2, 3, 4 and 5), Orient Chemicals (e.g. EP 0 347 803 A2, pages 5-6, azo dyes 3, 4, 5, 6, 7, 8, 12, 13, 14, 15 and 16), Canon, Hewlett-Packard and Seiko Epson Corporation or by colorant manufacturers including Fuji Photo Film Co., Nippon Kayaku and Mitsubishi.

Suitable further magenta colorants include PRO-JET™ Fast Magenta 2 and other magenta colorants made by, sold by or described in patents and patent applications by OEMs including Lexmark, Seiko Epson, Canon and Hewlett-Packard or colorant manufacturers including Fuji Photo Film Co., Nippon Kayaku and Mitsubishi.

Suitable further yellow colorants include C.I. Direct Yellow 142; C.I. Direct Yellow 132; C.I. Direct Yellow 86; PRO-JET™ Yellow OAM; PRO-JET™ Fast Yellow 2; C.I. Direct Yellow 85; C.I. Direct Yellow 173; and C.I. Acid Yellow 23 and other yellow colorants made by, sold by or described in patents and patent applications by OEMs including Lexmark, Seiko Epson, Canon and Hewlett-Packard or colorant manufacturers including Fuji Photo Film Co., Nippon Kayaku and Mitsubishi.

Suitable further cyan colorants include phthalocyanine colorants, C.I. Direct Blue 199 and C.I. Acid Blue 9 and other cyan colorants made by, sold by or described in patents and patent applications by OEMs including Lexmark, Seiko Epson, Canon and Hewlett-Packard or colorant manufacturers including Fuji Photo Film Co., Nippon Kayaku and Mitsubishi.

The ink composition may also contain additional components conventionally used in ink jet printing inks, for example viscosity and surface tension modifiers, corrosion inhibitors, biocides, kogation reducing additives and surfactants which may be ionic or non-ionic.

Typically the liquid medium will further comprise one or more surfactants, for example anionic and/or nonionic surfactants. Examples of anionic surfactants include: sulphonate surfactants such as sulphosuccinates (Aerosol™ OT, A196; AY and GP, available from CYTEC) and sulphonates (Aerosol™ DPOS-45, OS available from CYTEC; Witconate™ C-50H available from WITCO; Dowfax™ 8390 available from DOW); and fluoro surfactants (Fluorad™ FC99C available from 3M). Examples of nonionic surfactants include: fluoro surfactants (Fluorad™ FC170C available from 3M); alkoxylate surfactants (Tergitol™ series 15S-5, 15S-7, and 15S-9 available from Union Carbide); and organosilicone surfactants (Silwet™ L-77 and L-76-9 available from WITCO). The Surfynol™ range of surfactants (available from Air Products) may also be suitable.

In one embodiment inks according to the invention have a pH of from about 3 to about 5, preferably from about 3.5 to about 4.5. In another embodiment, which is more preferred, the pH of the composition is preferably from 4 to 11, more preferably from 7 to 10. Optionally the ink composition comprises a buffer.

One or more buffers may optionally be included in the liquid medium to modulate pH of the ink. The buffers can be organic-based biological buffers or inorganic buffers, preferably, organic-based. Examples of preferred buffers include tris(hydroxymethyl)aminomethane (TRIS), available from companies such as Aldrich Chemical (Milwaukee, Wis.), 4-morpholine ethanesulphonic acid (MES), 4-morpholinepropanesulphonic acid (MOPS), and beta-hydroxy-4-morpholinepropanesulphonic acid (MOPSO). Further, the buffers employed preferably provide a pH ranging from 3 to 10 in the practice of the invention.

One or more of the biocides commonly employed in ink jet inks may optionally be used in the ink, such as Nuosept™ 95, available from Huls America (Piscataway, N.J.); Proxel™ GXL, available from Arch Chemicals, Inc. (Norwalk, Conn.); and glutaraldehyde, available from Union Carbide Company (Bound Brook, N.J.) under the trade designation Ucarcide 250.

Inks according to the invention may optionally also include one or more metal chelators. Such chelators are used to bind any free transition metal cations that may be present in the ink. Examples of preferred metal chelators include: ethylenediaminetetraacetic acid ("EDTA"), diethylenediaminepentaacetic acid ("DPTA"), trans-1,2-diaminocyclohexanetetraacetic acid ("CDTA"), ethylenedinitrilotetraacetic acid ("EGTA"). Other chelators may be employed additionally or alternatively.

The viscosity of the ink at 25° C. is preferably less than 50 cP, more preferably less than 20 cP and especially less than 5 cP.

Preferably, ink compositions of the present invention suitable for use in an ink-jet printer have been filtered through a filter having a mean pore size below 10 μm, more preferably below 3 μm, especially below 2 μm, more especially below 1

µm. This filtration removes particulate matter that could otherwise block the fine nozzles found in many ink-jet printers.

When the compositions according to the second aspect of the present invention are used as ink jet printing compositions, the composition preferably has a concentration of halide ions of less than 500 parts per million, more preferably less than 100 parts per million. Ink compositions of the present invention suitable for use in an ink-jet printer preferably contain less than 500 ppm, more preferably less than 250 ppm, especially less than 100 ppm, more especially less than 10 ppm in total of divalent and trivalent metal ions (other than any divalent and trivalent metal ions bound to a compound of Formula (1) or any other component of the ink). We have found that purifying the compositions to reduce the concentration of these undesirable ions reduces nozzle blockage in ink jet printing heads, particularly in thermal ink jet printers.

A further aspect of the invention provides a process for printing an image on a substrate which comprises applying a composition according to the second aspect of the present invention to the substrate by means of an ink jet printer.

The ink jet printer preferably applies the composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

The substrate is preferably paper, plastic, a textile, metal or glass, more preferably a treated substrate such as a coated paper or coated plastic, especially coated paper.

Preferred plain or treated papers are papers which may have an acid, alkaline or neutral character. Examples of commercially available plain and treated papers include:

Photo Paper Pro (PR101), Photo Paper Plus (PP101), Glossy Photo Paper (GP401), Semi Gloss Paper (SG101), Matte Photo Paper (MP101), (all available from Canon); Premium Glossy Photo Paper, Premium Semi gloss Photo Paper, ColorLife™, Photo Paper, Photo Quality Glossy Paper, Double-sided Matte Paper, Matte Paper Heavyweight, Photo Quality Inkjet Paper, Bright White Inkjet Paper, Premium Plain Paper, (all available from Seiko Epson Corp); HP All-In-One Printing Paper, HP Everyday Inkjet Paper, HP Everyday Photo Paper Semi-glossy, HP Office Paper, HP Photo Paper, HP Premium High-Gloss Film, HP Premium Paper, HP Premium Photo Paper, HP Premium Plus Photo Paper, HP Printing Paper, HP Superior Inkjet Paper, HP Advanced Photo Paper (all available from Hewlett Packard Inc.); Everyday Glossy Photo Paper, Premium Glossy Photo Paper, (both available from Lexmark™ Inc.); Matte Paper, Ultima Picture Paper, Premium Picture Paper, Picture Paper, Everyday Picture Paper (available from Kodak Inc.).

The present compounds and compositions described herein provide prints of attractive, neutral black shades which are particularly well suited for the ink jet printing of text and images. The compositions have good storage stability and low tendency to block the very fine nozzles used in ink jet printers. Furthermore, the resultant images have excellent optical density, shade, light-fastness, wet-fastness, humidity fastness and resistance to fading in the presence of oxidising air pollutants (e.g. ozone), especially optical density and light-fastness.

According to a still further aspect of the present invention there is provided a substrate on which an image has been printed by the process of the present invention as hereinbefore defined. Preferably, the substrate comprises a paper, an overhead projector slide or a textile material.

When the substrate is a textile material the process for printing an image preferably comprises:

i) applying the ink composition to the textile material using an ink jet printer; and ii) heating the resultant printed textile material at a temperature of from 50° C. to 250° C.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in European Patent Application No. 534660A1.

According to a yet still further aspect of the present invention there is provided an ink jet printer cartridge, optionally refillable, comprising one or more chambers and an ink composition, wherein the ink composition is present in at least one of the chambers and the ink composition is an ink composition according to the present invention as herein defined.

According to another aspect of the present invention there is provided an ink set comprising at least a black ink, a magenta ink, a cyan ink and a yellow ink and wherein the black ink comprises a compound according to the first aspect of the present invention as hereinbefore defined or a salt thereof and/or an ink composition as hereinbefore defined.

According to still another aspect of the present invention there is provided use of a compound according to the first aspect of the present invention as hereinbefore defined or a salt thereof to provide a printed image having good optical density, light fastness, wet fastness or resistance to fading in the presence of oxidising gases.

In this specification, unless the context clearly indicates otherwise, as used herein plural forms of the terms herein are to be construed as including the singular form and vice versa.

Throughout the description and claims of this specification, unless the context clearly indicates otherwise, the words "comprise" and "contain" and variations of the words, for example "comprising" and "comprises", mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention is now further illustrated by the following Examples in which all parts and percentages are by weight unless otherwise stated. The Examples are only illustrative of the invention and are not limiting on the scope of the invention.

EXAMPLE 1

Preparation of:

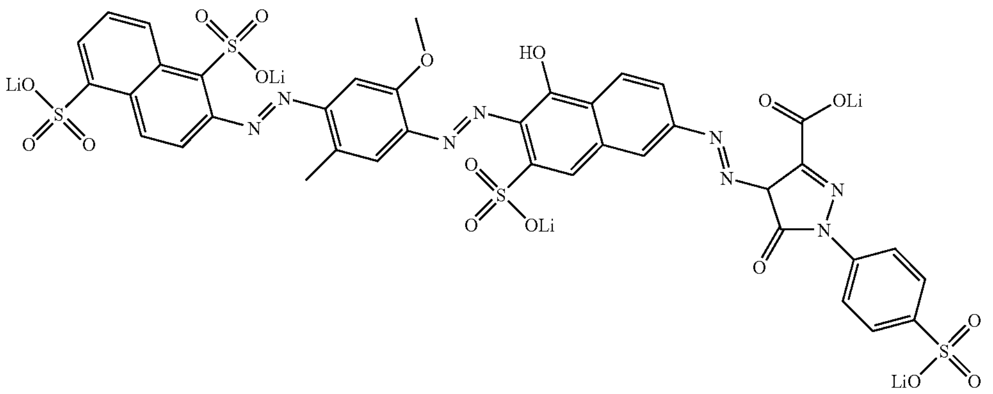

Stage A

Preparation of the mixed salt of A-N═N—B—$NH_2$:

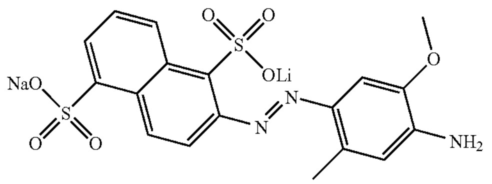

2-Aminonaphthalene-1,5-disulphonic acid (49 g, 0.1 M, MI=490) was dissolved in water (500 ml) at pH 7-8 by addition of 2N LiOH. The solution was screened through GFA filters and sodium nitrate (6.9 g, 0.1 M) was added to the filtrate. The resulting mixture was then added to a stirred mixture of ice/water and cHCl (30 ml) resulting in a pH 1 solution which was maintained at 0-10° C. for one hour. After this time the excess nitrous acid was destroyed by addition of sulphamic acid, which was tested with sulphone indicator.

2-Methoxy-5-methylaniline (13.7 g, 0.1 M, MI=137) was dissolved in acetone (200 ml) and this solution was added to the previously prepared diazo solution dropwise over 20 minutes maintaining the temperature at 0-10° C. Pyridine (10 ml) was then added in one portion and the resulting mixture was stirred overnight whilst being allowed to warm to room temperature.

The suspension was drowned into acetone (5 L) and the precipitate was filtered and pulled dry. The resulting product was dried in the oven to give A-N═N—B—$NH_2$ (32.5 g)

Stage B

Preparation of the Mixed Salt:

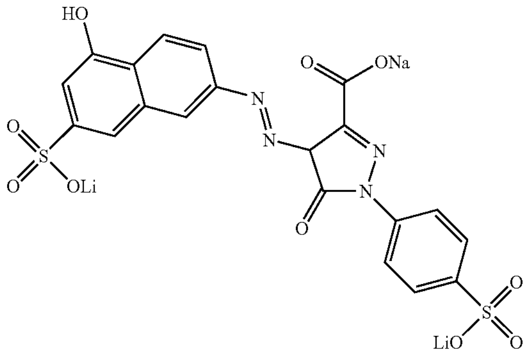

7-Amino-4-hydroxynaphthalene-2-sulphonic acid (26.5 g, 0.1 M, MI=265) was dissolved in water (400 ml) at pH 7-8 by addition of 2N LiOH. The solution was screened through GFA filters and sodium nitrate (6.9 g, 0.1 M) was added to the filtrate. The resulting mixture was then added to a stirred mixture of ice/water and cHCl (50 ml) resulting in a pH 1 solution which was maintained at 0-10° C. for one hour. After this time the excess nitrous acid was destroyed by addition of sulphamic acid, which was tested with sulphone indicator.

5-Oxo-1-(4-sulphophenyl)-4,5-dihydro-1H-pyrazole-3-carboxylic acid (40 g, 0.114 M, MI=350) was dissolved in water (400 ml) with addition of 2N LiOH. The solution was screened through GFA filters and this solution was added to the previously prepared diazo solution dropwise over 20 minutes maintaining the temperature at 0-10° C. This mixture was adjusted to pH 5 by addition of pyridine (35 ml) and the resulting mixture was stirred overnight whilst being allowed to warm to room temperature.

The suspension was drowned into acetone (5 L) and the precipitate was filtered, washed with a little acetone and pulled dry. The resulting product was dried in the oven to give 4-[(5-hydroxy-7-sulfo-2-naphthyl)diazenyl]-5-oxo-1-(4-sulfophenyl)-4,5-dihydro-1H-pyrazole-3-carboxylic acid (64 g)

Stage C—Title Dye

The product from stage A, A-N═N—B—$NH_2$ (12 g, 0.02 M, MI=600)) was suspended in NMP (200 ml) and sodium nitrate (2 g) was added in one go. The mixture was stirred for 15 min to give a smooth suspension and then dilute HCl [Made from cHCl (8 ml) and water (200 ml)] was added in one portion. Over the next hour the suspension was allowed to self cool to room temperature whilst stirring. After this time the excess nitrous acid was destroyed by addition of sulphamic acid, which was tested with sulphone indicator.

The product from stage B (14 g, 0.0186 M, MI=750) was dissolved in water (200 ml) at pH 8 by the addition of 2N LiOH. The diazo suspension prepared above was added over 30 min whilst maintaining a temperature of 0-10° C. using ice and a pH 8-9 using 2N LiOH. The resulting mixture was allowed to stir for 1 hour.

The suspension was drowned into acetone (3 L) and the precipitate was filtered, washed with a little acetone and pulled dry. The resulting product was dissolved in water and dialysed before screening with a 0.45 um nylon filter. The resulting solution was evaporated to dryness at 60° C. to give the title dye (17.1 g, 6.3 mM, MI=1132, $\lambda_{max}$=570 nm).

EXAMPLES 2-9

The same methodology as Example 1 was repeated to prepare the salts of the dye compounds whose structures are shown below in Table 1.

TABLE 1

| Ex No. | Compound | $\lambda_{max}$ (nm) |
|---|---|---|
| 2 | 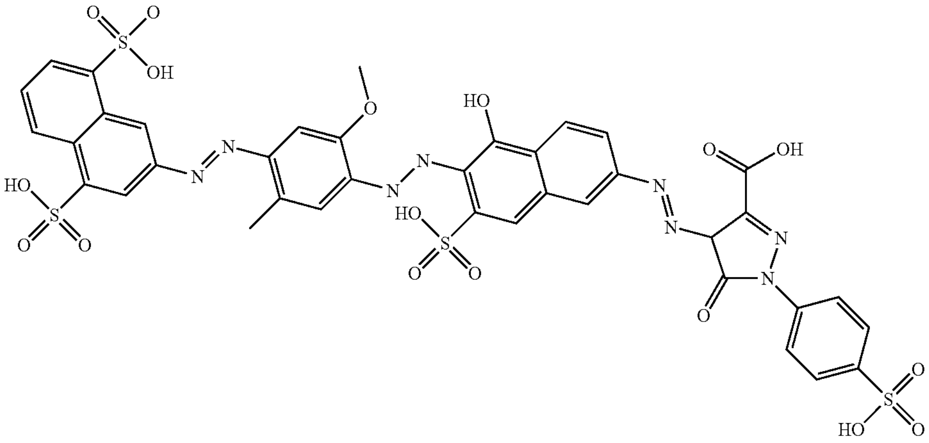 | 578 |
| 3 | 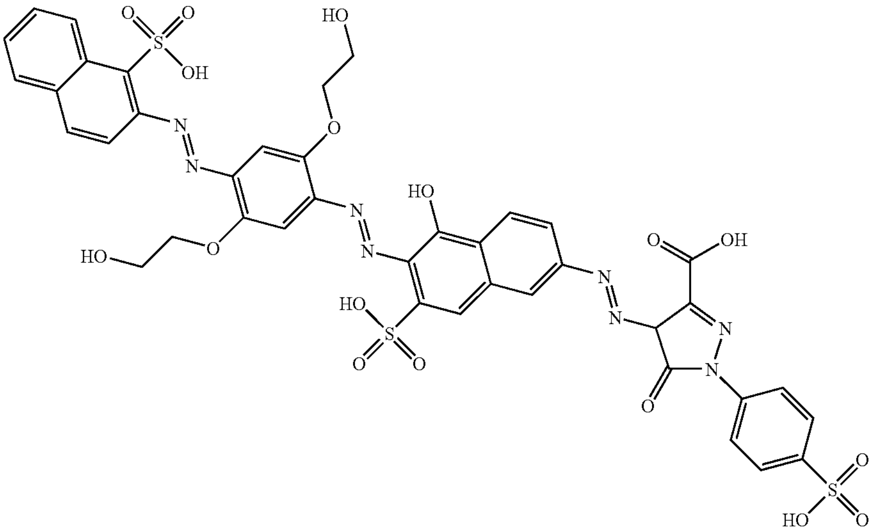 | 572 |

TABLE 1-continued
| Ex No. | Compound | $\lambda_{max}$ (nm) |
|---|---|---|
| 4 | 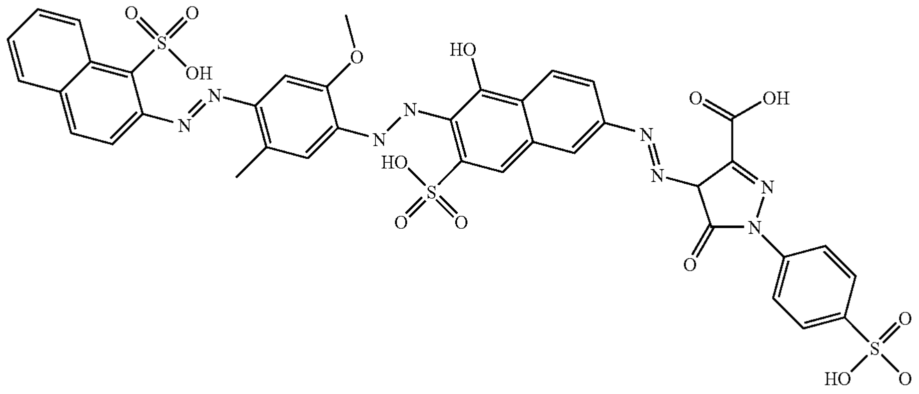 | 563 |
| 5 | 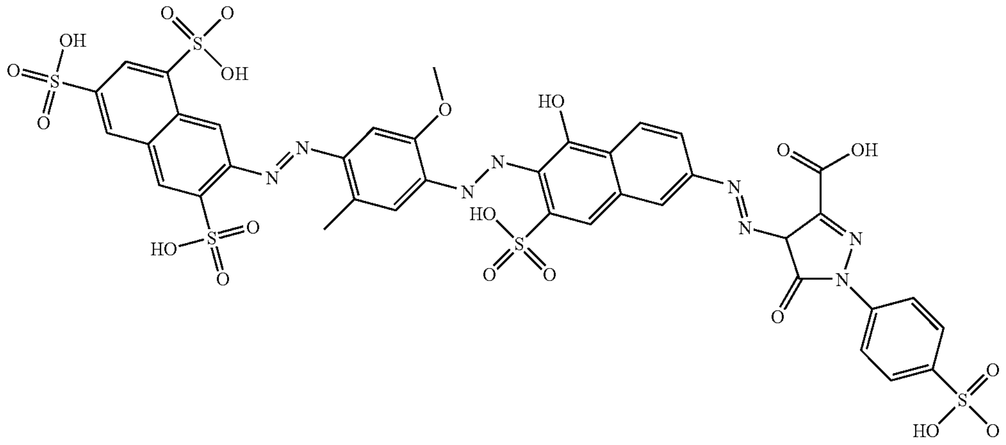 | 581 |
| 6 | 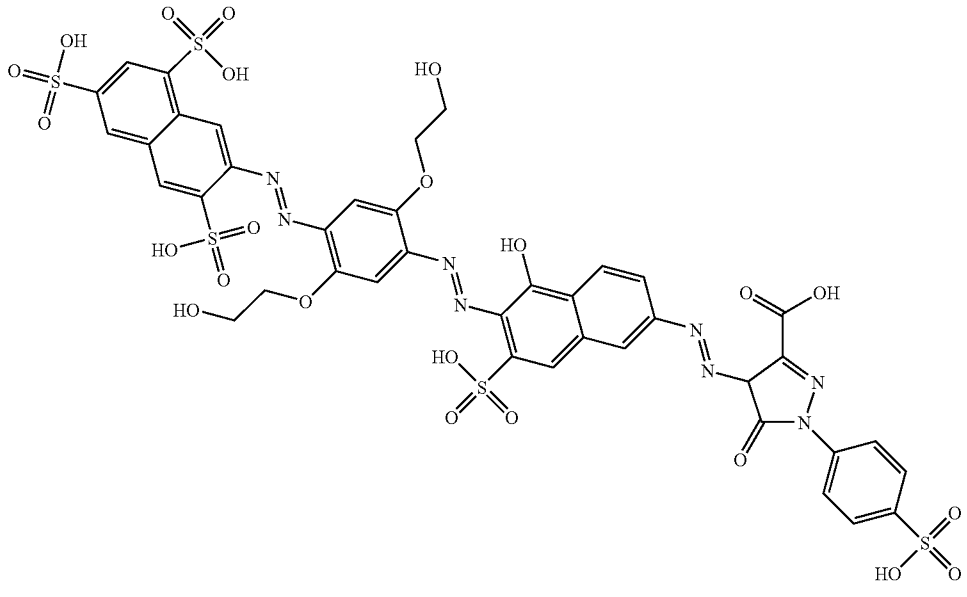 | 588 |

TABLE 1-continued
| Ex No. | Compound | $\lambda_{max}$ (nm) |
|---|---|---|
| 7 | 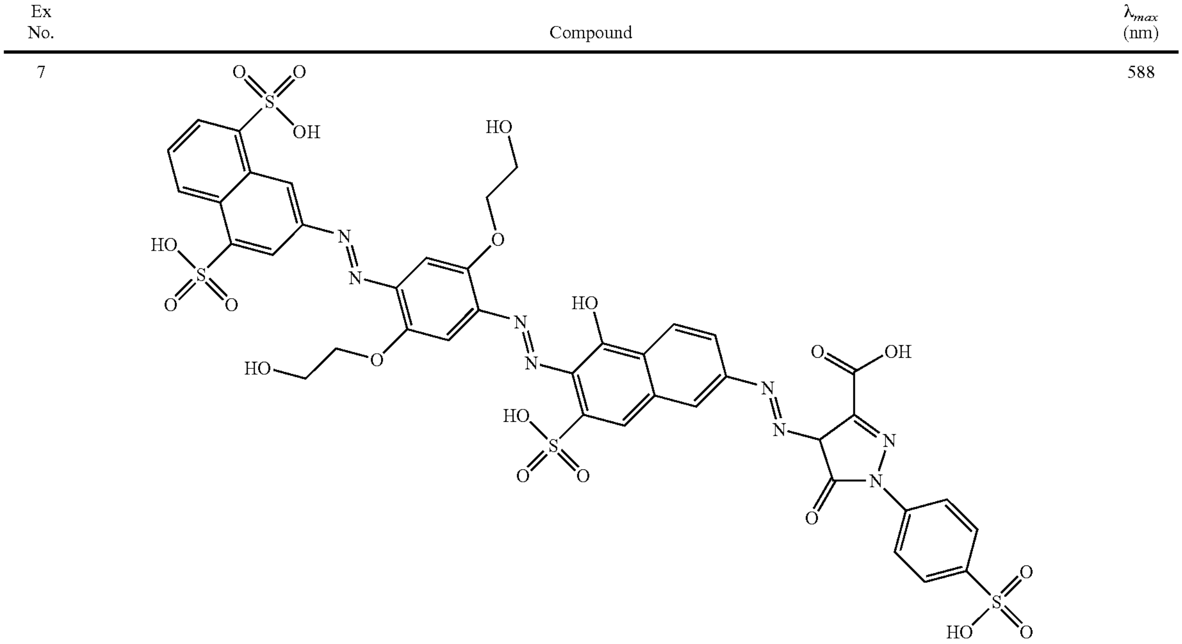 | 588 |
| 8 | 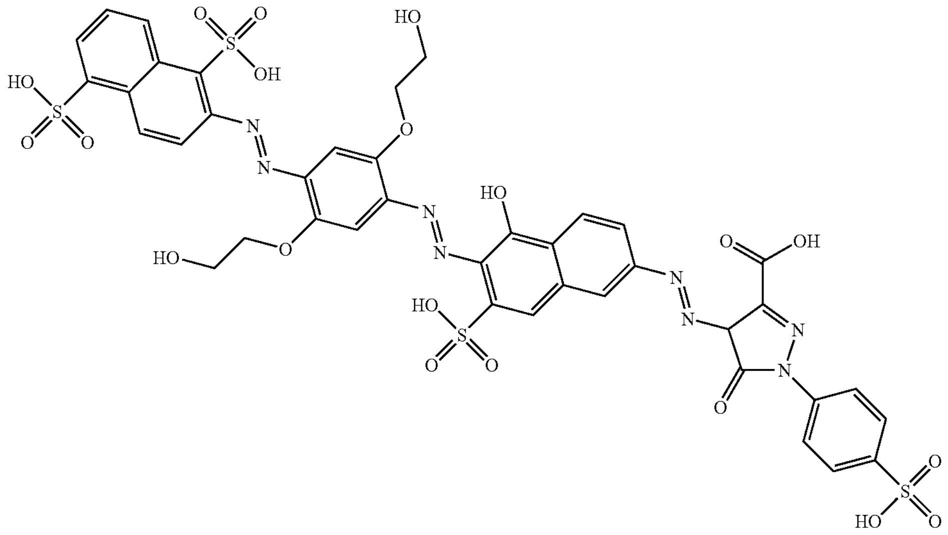 | 578 |
| 9 | 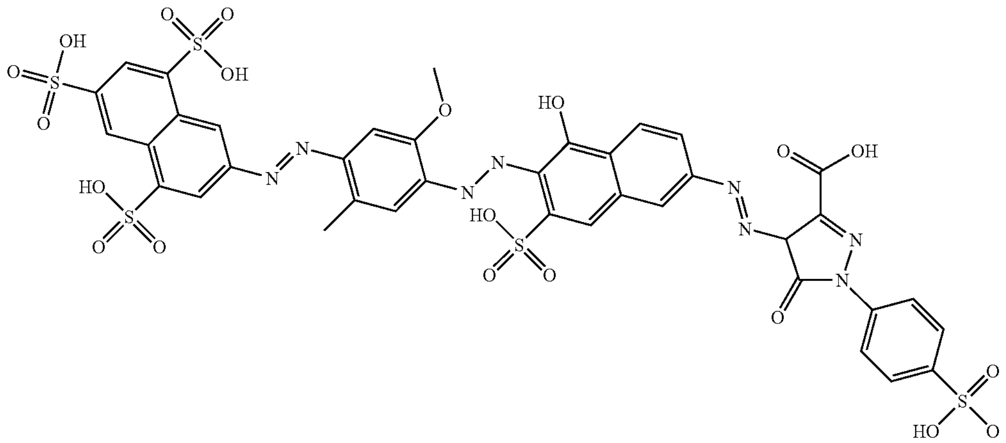 | 585 |

EXAMPLE 10

Inks

Inks may be prepared containing the dye compounds above from Example 1 to Example 9 according to the following formulation:

| | |
|---|---|
| 2-Pyrrolidone | 5 parts |
| Thiodiglycol | 5 parts |
| Surfynol ™ 465 | 1 part |
| Dye | 3 parts |
| Water | amount required to make up to 100 parts |

Surfynol ™ 465 is a surfactant available from Air Products and Chemicals Inc., USA.

Further inks may be prepared according to the Tables 2 and 3 below wherein the dye described in the first column is the dye made in the above example of the same number. Numbers quoted in the second column onwards refer to the number of parts of the relevant ingredient and all parts are by weight. The inks may be applied to paper for example by thermal or piezo ink jet printing.

The following abbreviations are used in the Tables

PG=propylene glycol

DEG=diethylene glycol

NMP=N-methylpyrollidone

DMK=dimethylketone

IPA=isopropanol

MeOH=methanol

2P=2-pyrolidone

MIBK=methylisobutyl ketone

P12=propane-1,2-diol

BDL=butane-2,3-diol

CET=cetyl ammonium bromide

PHO=$Na_2HPO_4$ and

TBT=tertiary butanol

TDG=thiodiglycol

TABLE 2

| Dye | Compound Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 1 | 4.1 | 80 | 3 | 5 | 2 | 10 | | 0.3 | | | | |
| 2 | 3.2 | 65 | | 5 | 4 | 6 | | | 5 | 4 | 6 | 5 |
| 3 | 5.1 | 96 | | | | | | | | 4 | | |
| 4 | 10.8 | 90 | 5 | | | | | | 5 | | | |
| 5 | 10.0 | 80 | 2 | 6 | 2 | 5 | | | 1 | | 4 | |
| 6 | 1.8 | 80 | | 5 | | | | | | | 15 | |
| 7 | 2.6 | 84 | | | 11 | | | | | | 5 | |
| 8 | 3.3 | 80 | 2 | | | 10 | | | | 2 | | 6 |
| 9 | 12.0 | 90 | | | | 7 | 0.3 | | 3 | | | |
| 1 | 5.4 | 69 | 2 | 20 | 2 | 1 | | | | | 3 | 3 |
| 2 | 6.0 | 91 | | | 4 | | | | | | 5 | |

TABLE 3

| Dye | Dye Content | Water | PG | DEG | NMP | CET | TBT | TDG | BDL | PHO | 2P | PI2 |
|---|---|---|---|---|---|---|---|---|---|---|---|---|
| 1 | 3.0 | 80 | 15 | | | 0.2 | | | | | 5 | |
| 2 | 9.0 | 90 | | 5 | | | | | | 1.2 | | 5 |
| 3 | 1.5 | 85 | 5 | 5 | | 0.15 | 5.0 | 0.2 | | | | |
| 4 | 2.5 | 90 | | 6 | 4 | | | | | 0.12 | | |
| 5 | 3.1 | 82 | 4 | 8 | | 0.3 | | | | | | 6 |
| 6 | 0.9 | 85 | | 10 | | | | | 5 | 0.2 | | |
| 7 | 8.0 | 90 | | 5 | 5 | | | 0.3 | | | | |
| 8 | 4.0 | 70 | | 10 | 4 | | | | 1 | | 4 | 11 |
| 9 | 2.2 | 75 | 4 | 10 | 3 | | | | 2 | | 6 | |
| 1 | 10.0 | 91 | | | 6 | | | | | | 3 | |
| 2 | 9.0 | 76 | | 9 | 7 | | 3.0 | | | 0.95 | 5 | |
| 3 | 5.0 | 78 | 5 | 11 | | | | | | | 6 | |
| 4 | 5.4 | 86 | | | 7 | | | | | | 7 | |
| 5 | 2.1 | 70 | 5 | 5 | 5 | 0.1 | 0.2 | 0.1 | 5 | 0.1 | 5 | |
| 6 | 2.0 | 90 | | 10 | | | | | | | | |
| 7 | 2 | 88 | | | | | | 10 | | | | |
| 8 | 5 | 78 | | | 5 | | | 12 | | | 5 | |
| 9 | 8 | 70 | 2 | | 8 | | | 15 | | | 5 | |
| 1 | 10 | 80 | | | | | | 8 | | | 12 | |
| 2 | 10 | 80 | | 10 | | | | | | | | |

EXAMPLES 11-14

Print Test Examples

Inks were prepared as described in Example 10 and ink-jet printed onto a variety of substrates (papers) using a Canon i965 printer. The CIE colour co-ordinates of each print (A, B, L, Chroma (C) and hue (H)) were measured using a Gretag Spectrolino Spectrodensitometer™ with 0°/45° measuring geometry with a spectral range of 400-700 nm at 20 nm spectral intervals using illuminant D65 with a 2° (CIE 1931) observer angle and a density operation of status A. No less than 2 measurements were taken diagonally across a solid colour block on the print with a size greater than 10 mm×10 mm.

Dyes from Examples 1 and 5 above were used to prepare inks.

In addition to inks containing the dye compounds of the present invention, for comparative purposes inks were also prepared containing dye compounds not within the scope of the present invention ("Comparative Dyes"). In each of the Comparative Dyes the A group was not a group of Formula X as herein defined. The Comparative Dyes were as follows:

Optical Density

The optical density (OD) properties of resultant prints are shown in Table 4 where the Example number of the dye compound used to prepare the ink is indicated in the second column. The results demonstrate that inks based on compounds of the present invention display good optical density, which is higher than for inks based on the Comparative compounds.

The substrates that were used are referred to in the Tables below by the following references numbers:

| Substrate name | Substrate Number |
|---|---|
| HP Printing Paper | 1 |
| HP Premium Plus Glossy Photo Media | 2 |
| Canon PR101 ™ photo paper | 3 |
| Epson Premium Glossy Photo Media | 4 |

Comparative Dye C1

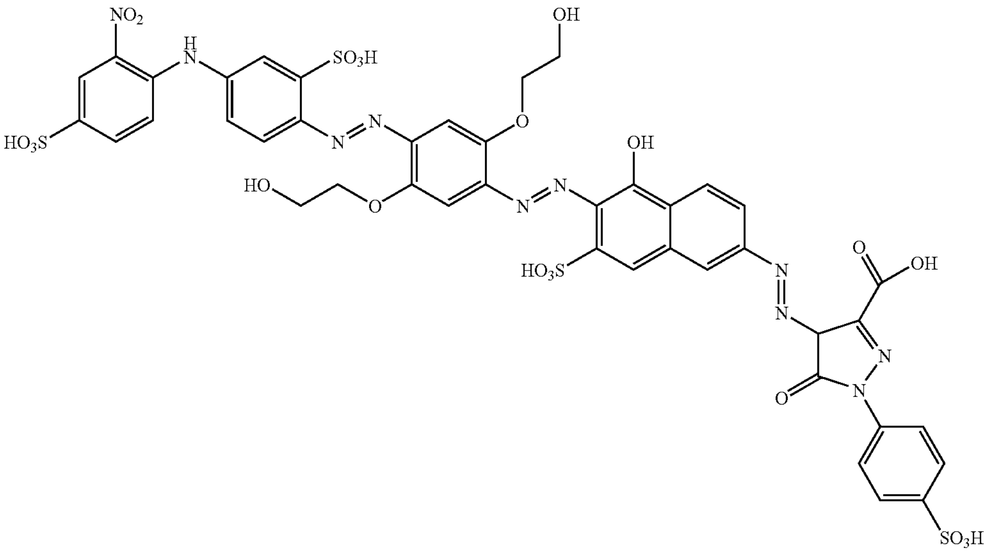

Comparative Dye C2

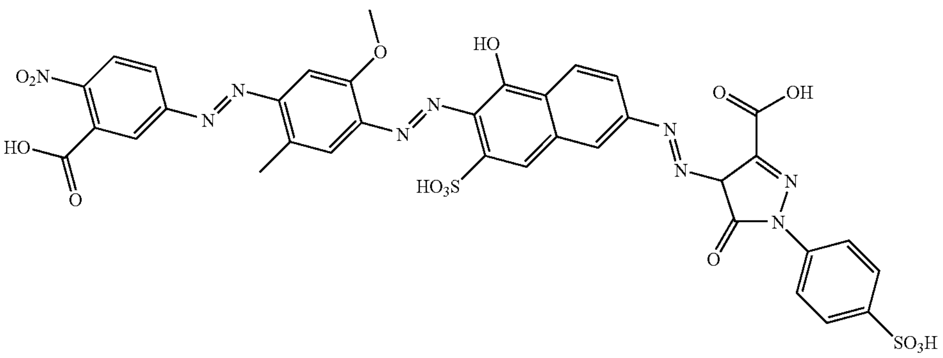

TABLE 4

| Ex. No. | Dye | SUBSTRATE | Optical Density (OD) |
|---|---|---|---|
| 11 | 1 | 1 | 1.12 |
| 11 | 5 | 1 | 1.20 |
| 11 | C1 | 1 | 1.03 |
| 11 | C2 | 1 | 0.94 |
| 12 | 1 | 2 | 1.82 |
| 12 | 5 | 2 | 1.85 |
| 12 | C1 | 2 | 1.76 |
| 12 | C2 | 2 | 1.55 |

Light Fastness

To evaluate light fastness the prints described above were irradiated in an Atlas Ci5000 Weatherometer™ for 100 hours. The results are shown in Table 5 where the example number of the dye used to prepare the ink is indicated in the second column. The degree of fade after exposure to light is expressed as % loss in the optical density (OD). The smaller the % loss in the optical density the higher the light fastness. The results demonstrate that inks based on compounds of the present invention display better light fastness.

TABLE 5

| Ex. No. | Dye | SUBSTRATE | OD LOSS (%) |
|---|---|---|---|
| 13 | 1 | 3 | 26.9 |
| 13 | 5 | 3 | 29.9 |
| 13 | C1 | 3 | 31.6 |
| 13 | C2 | 3 | 32.4 |
| 14 | 1 | 4 | 16.5 |
| 14 | 5 | 4 | 16.5 |
| 14 | C1 | 4 | 16.8 |
| 14 | C2 | 4 | 24.1 |

The invention claimed is:

1. A compound of Formula (1) or a salt thereof:

Formula (1)

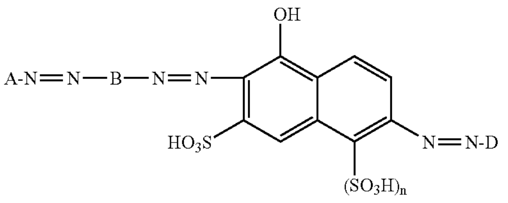

wherein:

A is a beta naphthyl group of formula X,

Formula X

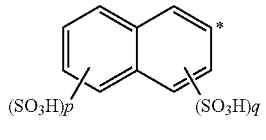

wherein * is the point of attachment to the azo group in Formula (1)

p and q are each independently 0, 1 or 2 and the sum of p+q is not zero;

B is optionally substituted phenylene or naphthylene;

n is 0 or 1; and

D is an optionally substituted pyrazolyl group.

2. A compound or salt according to claim 1 wherein D is a pyrazolyl group carrying at least one carboxy, sulpho or phosphato group.

3. A compound or salt according to claim 1 wherein A is not substituted by groups other than sulpho.

4. A compound or salt according to claim 1 wherein p and q are each independently 0, 1 or 2, provided the sum of p+q is 1, 2 or 3.

5. A compound or salt according to claim 1 wherein B is an optionally substituted phenylene group.

6. A compound or salt according to claim 1 wherein:

A is not substituted by any group other than sulpho;

B is phenylene or naphthylene carrying one or two substituents selected from the group consisting of sulpho, optionally substituted $C_{1-6}$ alkyl, optionally substituted $C_{1-6}$ alkoxy and optionally substituted amino groups;

n is 0 or 1;

D is of Formula (3a),(3b) or (3c);

Formula (3a)

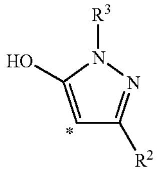

Formula (3b)

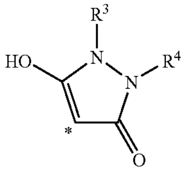

Formula (3c)

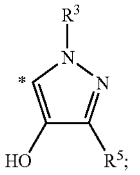

wherein:

$R^2$ is H, methyl, carbonamide or carboxy;

$R^3$ and $R^4$ are each independently phenyl or naphthyl carrying one or two substituents selected from the group consisting of sulpho and carboxy groups; and $R^5$ is a $C_{1-4}$alkylcarboxyester.

7. A compound or salt according to claim 6 wherein:

A is of formula X',

Formula X'

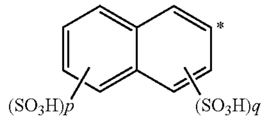

wherein * is the point of attachment to the azo group in Formula (1), p and q are each independently 0, 1 or 2 and the sum of p+q is 1, 2 or 3;

B is phenylene or naphthylene carrying one or two substituents selected from the group consisting of sulpho, methyl, methoxy, ethoxy and 2-hydroxyethoxy groups;

n is 0 or 1; and

D is of Formula (3a), (3b) or (3c):

Formula (3a)

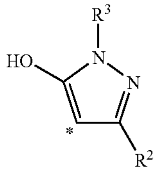

-continued

Formula (3b)

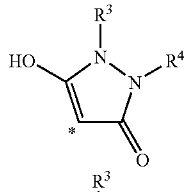

Formula (3c)

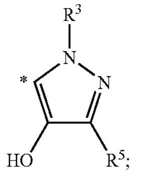

wherein:

$R^2$ is H, methyl, carbonamide or carboxy;

$R^3$ and $R^4$ are each independently phenyl or naphthyl carrying one or two substituents selected from the group consisting of sulpho and carboxy groups; and $R^5$ is a $C_{1-4}$alkylcarboxyester.

8. A compound or salt according to claim 1 wherein the sum of p+q is 2.

9. A compound or salt according to claim 8 wherein p=1 and q=1.

10. A compound or salt according to claim 8 which is of Formula 1C:

Formula 1C

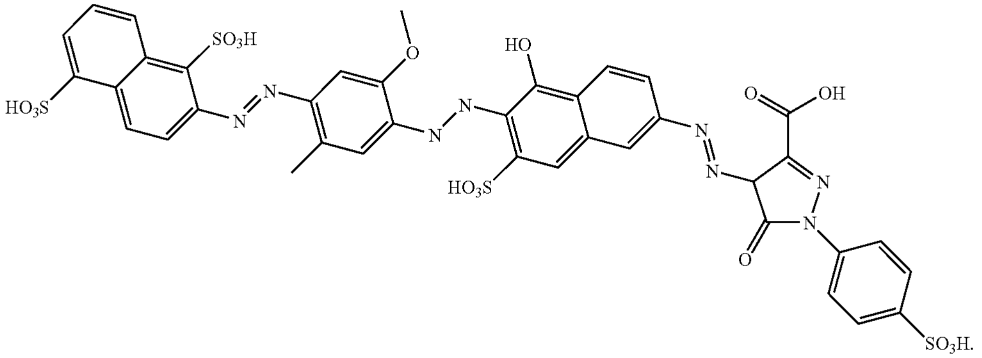

11. A salt according to claim 1.

12. An ink composition which comprises a compound or a salt according to claim 1 and a liquid medium.

13. An ink composition according to claim 12 which further comprises an additional colorant.

14. A process for printing an image on a substrate comprising applying thereto a composition according to claim 12 by means of an ink jet printer.

15. A paper, an overhead projector slide or a textile material printed with a composition according to claim 12.

16. An optionally refillable ink jet printer cartridge, comprising one or more chambers and a composition according to claim 12 or claim 13 which is present in at least one of the chambers.

* * * * *